(12) United States Patent
Jung et al.

(10) Patent No.: US 12,191,084 B2
(45) Date of Patent: Jan. 7, 2025

(54) MULTI-LAYERED CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Hee Jung Jung, Suwon-si (KR); Jun Il Kang, Suwon-si (KR); Mi Jung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 109 days.

(21) Appl. No.: 18/072,914

(22) Filed: Dec. 1, 2022

(65) Prior Publication Data

US 2023/0207206 A1 Jun. 29, 2023

(30) Foreign Application Priority Data

Dec. 28, 2021 (KR) .................. 10-2021-0190278

(51) Int. Cl.
*H01G 4/232* (2006.01)
*H01G 4/248* (2006.01)
*H01G 4/30* (2006.01)
*H01G 4/12* (2006.01)

(52) U.S. Cl.
CPC .......... *H01G 4/2325* (2013.01); *H01G 4/248* (2013.01); *H01G 4/30* (2013.01); *H01G 4/12* (2013.01)

(58) Field of Classification Search
None
See application file for complete search history.

(56) References Cited

U.S. PATENT DOCUMENTS

| 2008/0118721 | A1* | 5/2008 | Horie | H01C 7/18 428/209 |
| 2016/0086733 | A1* | 3/2016 | Saito | H01G 4/1227 205/183 |
| 2017/0345562 | A1 | 11/2017 | Shimada | |

FOREIGN PATENT DOCUMENTS

| JP | 2020-136363 A | 8/2020 |
| KR | 10-2017-0135711 A | 12/2017 |

* cited by examiner

*Primary Examiner* — Eric W Thomas
(74) *Attorney, Agent, or Firm* — Morgan, Lewis & Bockius LLP

(57) ABSTRACT

A multilayer ceramic capacitor and a method of manufacturing the same are disposed. The multilayer ceramic capacitor includes: a body including a plurality of internal electrodes and a dielectric layer interposed between the plurality of internal electrodes; and external electrodes disposed on the body and connected to the internal electrodes, respectively. One of the external electrodes includes a first plating layer, and the first plating layer includes a crystal grain in which an average ratio of major and minor axes thereof is 1:1 to 3:1.

19 Claims, 7 Drawing Sheets

MULTI-LAYERED CERAMIC CAPACITOR AND METHOD OF MANUFACTURING THE SAME

CROSS-REFERENCE TO RELATED APPLICATION(S)

This application claims benefit of priority to Korean Patent Application No. 10-2021-0190278 filed on Dec. 28, 2021 in the Korean Intellectual Property Office, the disclosure of which is incorporated herein by reference in its entirety.

TECHNICAL FIELD

The present disclosure relates to a multilayer ceramic capacitor and a method of manufacturing the same.

BACKGROUND

A multilayer ceramic capacitor (MLCC), one of multilayer electronic components, may be a chip-type condenser mounted on the printed circuit boards of various electronic products, such as an imaging device including a liquid crystal display (LCD) or a plasma display panel (PDP), a computer, a smartphone or a mobile phone, serving to charge or discharge electricity therein or therefrom.

The MLCC may be used as a component of any of various electronic devices because the MLCC is small, has high capacitance, and is easily mounted. The multilayer ceramic capacitor also tends to have a smaller size and higher capacitance as electronic devices have recently ended to have smaller sizes and high performance.

According to this tendency, there has been increasing importance of reliability of the multilayer ceramic capacitor, and in particular, an increasing demand for improvement of its electrical characteristics.

SUMMARY

An aspect of the present disclosure may provide a multilayer ceramic capacitor having improved high-temperature reliability by suppressing hydrogen permeation, and a method of manufacturing the same.

However, the aspects of the present disclosure are not limited to that described in the description above, and may be more readily understood in the description of exemplary embodiments of the present disclosure.

According to an aspect of the present disclosure, a multilayer ceramic capacitor may include: a body including a plurality of internal electrodes and a dielectric layer interposed between the plurality of internal electrodes; and external electrodes disposed on the body and connected to the internal electrodes, respectively. One of the external electrodes may include a first plating layer, and the first plating layer may include a crystal grain in which an average ratio of major and minor axes thereof is 1:1 to 3:1.

According to another aspect of the present disclosure, a method of manufacturing a multilayer ceramic capacitor may include: preparing a body including a plurality of internal electrodes and a dielectric layer interposed between the plurality of internal electrodes; and forming external electrodes to respectively be connected to the internal electrodes. One of the external electrodes may includes a first plating layer, and the first plating layer may be formed by first plating using periodic pulse inversion plating.

According to another aspect of the present disclosure, a multilayer ceramic capacitor may include: a body including a plurality of internal electrodes and a dielectric layer interposed between the plurality of internal electrodes; and external electrodes disposed on the body and connected to the internal electrodes, respectively. One of the external electrodes may include a first plating layer, and the first plating layer may include a crystal grain having an average size of 0.3 to 1.5 μm.

According to another aspect of the present disclosure, a method of manufacturing a multilayer ceramic capacitor may include: preparing a body including a plurality of internal electrodes and a dielectric layer interposed between the plurality of internal electrodes; and forming external electrodes to respectively be connected to the internal electrodes. The one of the external electrodes may include a first plating layer formed by a plating in which hydrogen is absorbed in the first plating layer followed by another plating in which hydrogen is desorbed from the first plating layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
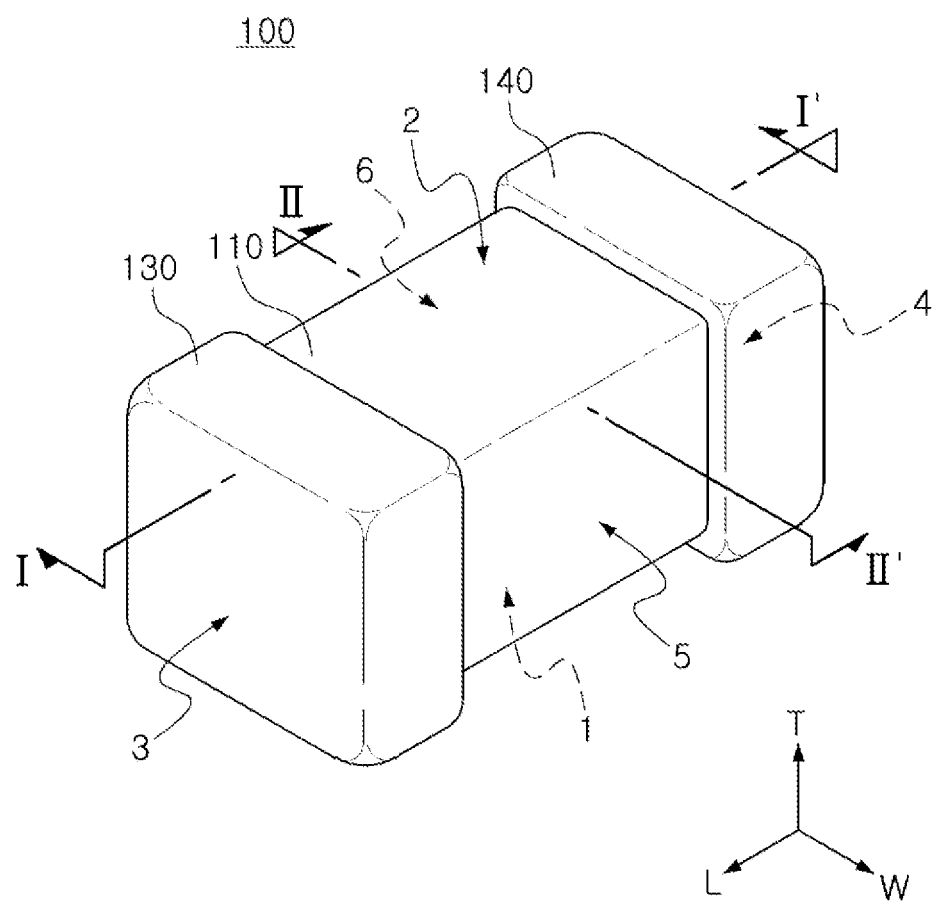
FIG. 1 is a perspective view schematically illustrating a multilayer ceramic capacitor according to an exemplary embodiment of the present disclosure.

Hereinafter, exemplary embodiments of the present disclosure will now be described in detail with reference to the accompanying drawings.

In the drawings, an L direction may indicate a first or length direction, a W direction may indicate a second or width direction, and a T direction may indicate a third, thickness or stack direction, and the directions are not limited thereto.

Multilayer Ceramic Capacitor

FIG. 1 is a perspective view schematically illustrating a multilayer ceramic capacitor according to an exemplary embodiment of the present disclosure.

Figure 2:
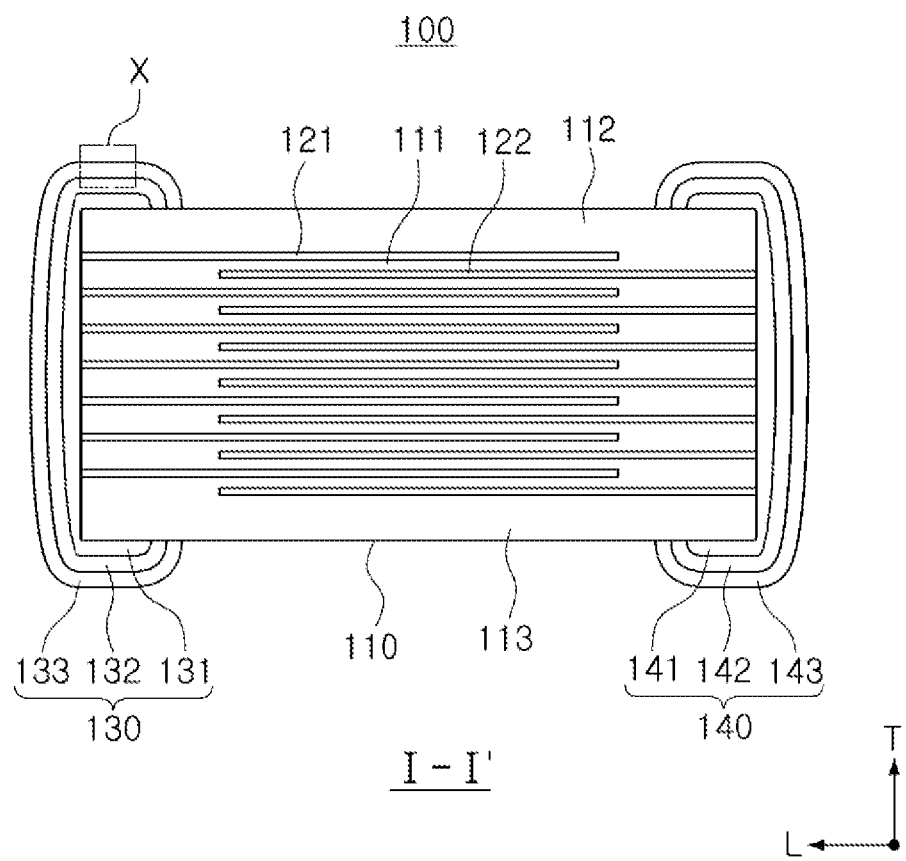
FIG. 2 is a schematic cross-sectional view taken along line I-I' of FIG. 1.

FIG. 2 is a schematic cross-sectional view taken along line I-I' of FIG. 1.

Figure 3:
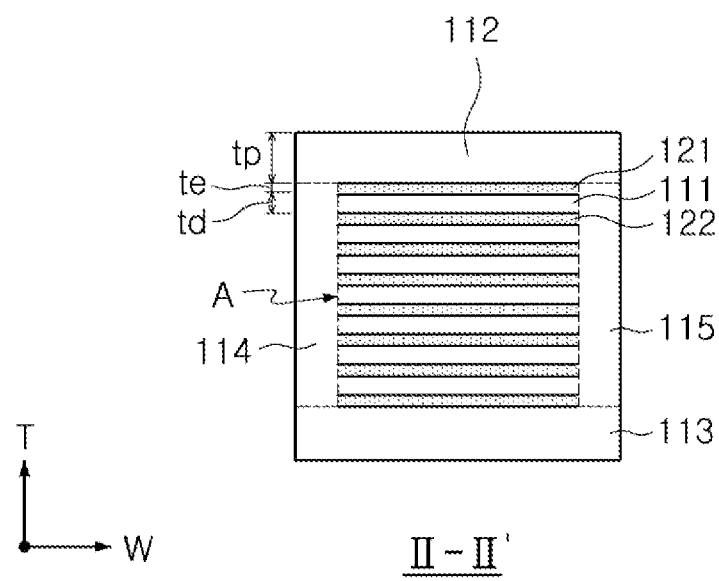
FIG. 3 is a schematic cross-sectional view taken along line II-II' of FIG. 1.

FIG. 3 is a schematic cross-sectional view taken along line II-II' of FIG. 1.

Figure 4:
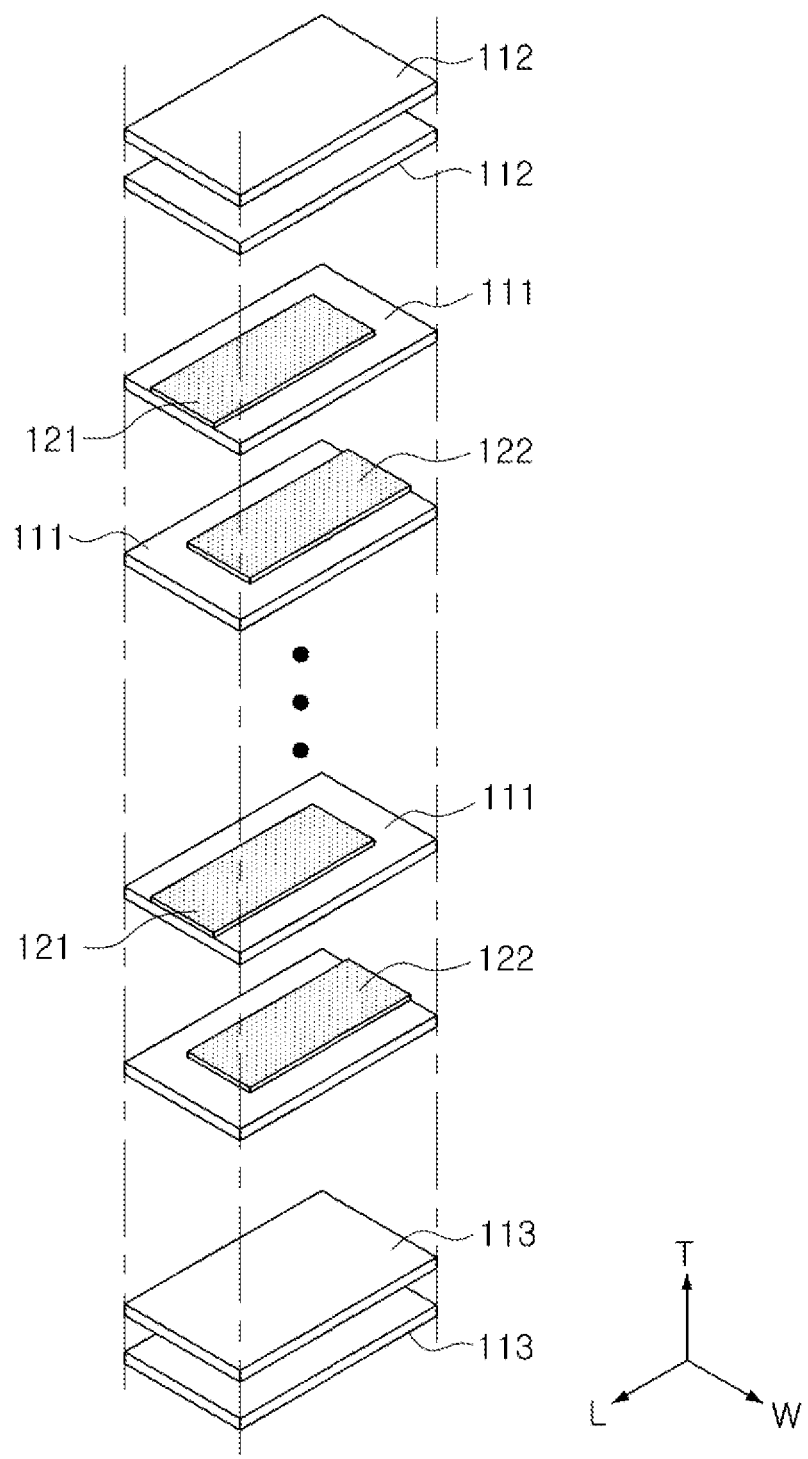
FIG. 4 is an exploded perspective view schematically illustrating an exploded body in which a dielectric layer and internal electrodes are stacked on each other for manufacturing the multilayer ceramic capacitor according to an exemplary embodiment of the present disclosure.

FIG. 4 is an exploded perspective view schematically illustrating an exploded body in which a dielectric layer and internal electrodes are stacked on each other in an exemplary embodiment of the present disclosure.

Hereinafter, the multilayer ceramic capacitor according to an exemplary embodiment of the present disclosure is described in detail with reference to FIGS. 1 through 4.

A multilayer ceramic capacitor 100 according to an exemplary embodiment of the present disclosure may include: a body 110 including a plurality of internal electrodes 121 and 122, and a dielectric layer 111 interposed between the plurality of internal electrodes; and external electrodes 130 and 140 disposed on the body and connected to the internal electrodes 121 and 122, respectively.

The body 110 may include the plurality of internal electrodes 121 and 122 and the dielectric layer 111 interposed between the plurality of internal electrodes 121 and 122. In the body, the dielectric layer 111 and the internal electrode 121 or 122 may be alternately stacked on each other.

The body 110 is not limited to a particular shape, and may have a hexahedral shape or a shape similar to the hexahedral shape, as illustrated in the drawings. The body 110 may not have the hexahedral shape having perfectly straight lines due to contraction of ceramic powder particles included in the body 110 in a sintering process, and have substantially the hexahedral shape.

The body 110 may have first and second surfaces 1 and 2 opposing each other in the thickness (T) direction, third and fourth surfaces 3 and 4 connected to the first and second surfaces 1 and 2 and opposing each other in the length (L) direction, and fifth and sixth surfaces 5 and 6 connected to the first and second surfaces 1 and 2, connected to the third and fourth surfaces 3 and 4, and opposing each other in the width (W) direction.

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

According to an exemplary embodiment of the present disclosure, a raw material of the dielectric layer 111 is not particularly limited as long as sufficient capacitance is obtained from the raw material. For example, the dielectric layer may use a material such as a barium titanate-based material, a lead composite perovskite-based material, a strontium titanate-based material or the like. The barium titanate-based material may include a barium titanate ($BaTiO_3$)-based ceramic powder, and this ceramic powder may be, for example, $BaTiO_3$ or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like, in which calcium (Ca), zirconium (Zr) or the like is partially dissolved in $BaTiO_3$.

The material of the dielectric layer 111 may be prepared by adding various ceramic additives, organic solvents, binders, dispersants and the like, to a powder such as the barium titanate ($BaTiO_3$) powder or the like, according to an object of the present disclosure.

The internal electrode 121 or 122 may be alternately disposed with the dielectric layer 111 in the thickness (T) direction. The internal electrodes may include the first internal electrode 121 and the second internal electrode 122. The first and second internal electrodes 121 and 122 may be alternately disposed to oppose each other interposing the dielectric layer 111 configuring the body 110 therebetween, and may respectively be exposed to the third and fourth surfaces 3 and 4 of the body 110.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

That is, the first and second internal electrodes 121 and 122 may be alternately exposed to (or extend from or be in contact with) the third surface 3 and the fourth surface 4 which are both cross sections of the body in the length (L) direction, and thus respectively be exposed to (or be in contact with) the first and second external electrodes 130 and 140.

The first internal electrode 121 may not be connected to the second external electrode 140 and may be connected to the first external electrode 130, and the second internal electrode 122 may not be connected to the first external electrode 130 and may be connected to the second external electrode 140. Accordingly, the first internal electrode 121 may be spaced apart from the fourth surface 4 by a predetermined distance, and the second internal electrode 122 may be spaced apart from the third surface 3 by the predetermined distance.

Here, the first and second internal electrodes 121 and 122 may be electrically insulated from each other by the dielectric layer 111 interposed therebetween.

A material forming each of the first and second internal electrodes 122 and 112 is not particularly limited, and may use a conductive paste formed of one or more of, for example, a noble metal material such as palladium (Pd), a palladium-silver (Pd—Ag) alloy or the like, nickel (Ni) or copper (Cu).

A method of printing the conductive paste may be a screen printing method, a gravure printing method or the like, and the method is not limited thereto.

Referring to FIG. 4, the body 110 may be formed by alternately stacking a ceramic green sheet on which the first internal electrode 121 is printed and a ceramic green sheet on which the second internal electrode 122 is printed on each other and then sintering the same.

Meanwhile, an average thickness of the internal electrode 121 or 122 may not need to be particularly limited. However, an average thickness te of the internal electrode 121 or 122 may be in a range of 100 nm to 1.5 μm in order for the multilayer electronic component to have a smaller size and higher capacitance.

A method of measuring the average thickness te of the internal electrode 121 or 122 is not particularly limited, and the average thickness may be measured based on a cross-section of the multilayer ceramic capacitor that is cut in the thickness (T) direction to observe the internal electrode.

For example, the average thickness may be measured by scanning an image of a cross-section of the body 110 in a length-thickness (L-T) direction using the scanning electron microscope (SEM).

In detail, as shown in FIG. 2, an average thickness value may be obtained from a thickness of the arbitrary first or second internal electrode 121 or 122 that is measured at each of thirty equally spaced points in the length (L) direction, extracted from the image obtained by scanning the cross-section of the body 110 in the length-thickness (L-T) direction that is cut in its central portion in the width (W) direction obtained by using a scanning electron microscope (SEM).

The body 110 may include a capacitance formation part "A" disposed in the body 110, including the first and second internal electrodes 121 and 122 disposed to oppose each other interposing the dielectric layer 111 therebetween, and forming capacitance of the capacitor, and cover parts 112 and 113 respectively disposed on the upper and lower portions of the capacitance formation part "A."

In addition, the capacitance formation part "A" may contribute to forming the capacitance of the capacitor, and be formed by repeatedly stacking the plurality of first and second internal electrodes 121 and 122 interposing the dielectric layer 111 therebetween.

The upper cover part 112 and the lower cover part 113 may respectively be formed by stacking one dielectric layer or two or more dielectric layers on the upper and lower surfaces of the capacitance formation part "A" in the thickness direction, and may basically serve to prevent the internal electrodes from being damaged due to physical or chemical stress.

The upper or lower cover part 112 or 113 may include no internal electrode and include the same material as the dielectric layer 111.

That is, the upper or lower cover part 112 or 113 may include a ceramic material and include, for example, a barium titanate ($BaTiO_3$)-based ceramic material.

Meanwhile, an average thickness tp of the cover part 112 or 113 may not need to be particularly limited. However, the cover part 112 or 113 may have a thickness tp of 20 μm or less in order for the multilayer electronic component to more easily have the smaller size and the higher capacitance.

In addition, margin parts 114 and 115 may each be disposed on a side of the capacitance formation part "A."

The margin parts 114 and 115 may include the margin part 114 disposed on the sixth surface 6 of the body 110 and the margin part 115 disposed on the fifth surface 5 of the body 110. That is, the margin parts 114 and 115 may be disposed on both sides of the ceramic body 110 in the width direction.

As shown in FIG. 3, the margin parts 114 and 115 may respectively indicate regions between both ends of the first and second internal electrodes 121 and 122 and a boundary surface of the body 110, based on a cross section of the body 110 that is cut in a width-thickness (W-T) direction.

The margin part 114 or 115 may basically serve to prevent the internal electrode from being damaged due to the physical or chemical stress.

The margin part 114 or 115 may be formed by forming the internal electrode by applying the conductive paste on the ceramic green sheet except for its portion where the margin part is to be formed.

Alternatively, in order to suppress a step difference occurring due to the internal electrodes 121 and 122, the margin parts 114 and 115 may respectively be formed by stacking the internal electrodes on each other, then cutting the internal electrodes to be exposed to the fifth and sixth surfaces 5 and 6 of the body, and then stacking one dielectric layer or two or more dielectric layers on both sides of the capacitance formation part "A" in the width direction.

The external electrodes 130 and 140 may be disposed on the body 110 and respectively be connected to the internal electrodes 121 and 122.

That is, as shown in FIG. 2, the capacitor may include the first and second external electrodes 130 and 140 respectively disposed on the third and fourth surfaces 3 and 4 of the body 110, and respectively connected to the first and second internal electrodes 121 and 122.

This exemplary embodiment describes that the multilayer electronic component 100 includes two external electrodes 130 and 140. However, the number, shape or the like of the external electrode 130 or 140 may depend on a shape of the internal electrode 121 or 122 or another purpose.

Meanwhile, the external electrode 130 or 140 may be made of any material having electrical conductivity, such as a metal, may use a specific material determined in consideration of electrical characteristics, structural stability or the like, and may have a multilayer structure.

For example, the external electrode 130 or 140 may include an electrode layer 131 or 141 disposed on the body 110 and plating layers 132, 133, 142, or 143 formed on the electrode layer.

Here, the electrode layer 131 or 141 may include a conductive metal and glass, and specifically, may be a fired electrode including the conductive metal and glass, or a resin-based electrode including the conductive metal and resin.

Alternatively, the electrode layer 131 or 141 may be formed by sequentially disposing the fired electrode and the resin-based electrode on the body. Alternatively, the electrode layer 131 or 141 may be formed by transferring a sheet including the conductive metal to the body or by transferring the sheet including the conductive metal to the fired electrode.

The conductive metal included in the electrode layer 131 or 141 may use a material having excellent electrical conductivity, and is not particularly limited. For example, the conductive metal may be at least one of nickel (Ni), copper (Cu) and alloys thereof.

The plating layers 132, 133, 142, or 143 may serve to improve a mount characteristic of the capacitor. The plating layers 132, 133, 142, or 143 is not limited to a particular type, may include at least one of nickel (Ni), tin (Sn), palladium (Pd) and alloys thereof, or may include a plurality of layers. As a more specific example of the plating layer, the plating layers 132, 133, 142, or 143 may be a nickel (Ni) plating layer or a tin (Sn) plating layer.

Alternatively, the plating layers 132, 133, 142, or 143 may be formed by sequentially disposing the Ni plating layer and the Sn plating layer on the electrode layer 131 or 141, or may be formed by sequentially arranging the Sn plating layer, the Ni plating layer, and the Sn plating layer. Alternatively, the plating layers 132, 133, 142, or 143 may include the plurality of Ni plating layers and/or the plurality of Sn plating layers.

Recently, it is an important task to implement stable performance of the multilayer ceramic capacitor in accordance with an intensified demand for its smaller size and higher capacitance.

However, in the multilayer ceramic capacitor, a current except for a leakage current may stop flowing when electric charge is stored in the internal electrode to thus fill up electrode capacitance. Insulation resistance (IR) may represent a measured resistance value of the multilayer ceramic capacitor, and the IR may be the most important index for determining reliability of the multilayer ceramic capacitor.

Regarding an IR characteristic, which is the most important index for determining the reliability of the multilayer ceramic capacitor, the present inventors presume that hydrogen permeating into the capacitor is the main cause of IR drop and conduct an evaluation to verify this presumption.

The present inventors analyze a hydrogen content of a reliable product and that of an IR-dropped product for the multilayer ceramic capacitor of the same type by using a thermal desorption spectroscopy (TDS) to thus find that the IR-dropped product has a permeated hydrogen content six-times or more than that of the reliable product.

That is, the multilayer ceramic capacitor is usually plated with Ni or Sn for mounting the capacitor on a board. Hydrogen may occur during a plating reaction, and hydrogen may inevitably occur due to a nature of an electrochemical reaction that occurs in a water system.

Accordingly, the present inventors recognize that it is necessary to minimize the hydrogen reaction in a plating process. However, prior inventors may neither recognize this technical problem nor develop technology for manufacturing a multilayer ceramic capacitor to which hydrogen permeation is suppressed.

In this regard, as a result of intensive review, the present inventors confirm that a crystal grain shape of the plating layer on the external electrode is affected by precisely controlling a plating condition or the like when manufacturing the multilayer ceramic capacitor.

In addition, the present inventors complete the present invention by discovering that the crystal grain shape of the plating layer is an important factor in suppressing a hydrogen permeation amount. In detail, the external electrode 130 or 140 according to the present disclosure may include the first plating layers 132 or 142, and the first plating layer may include a crystal grain in which an average ratio of major and minor axes thereof satisfies a range of 1:1 to 3:1.

The external electrode may include the first plating layer as at least one plating layer included therein, and the first plating layer may include the crystal grain that has a round shape in order for the average ratio of major and minor axes thereof to satisfy 1:1 or more and 3:1 or less, thereby improving high-temperature reliability of the capacitor. In detail, this configuration may minimize influence of hydrogen which inevitably occurs in the plating process, thereby improving the IR characteristic of the capacitor.

It may be difficult to expect the hydrogen permeation suppressed from the first plating layer when the first plating layers 132 or 142 includes the crystal grain in which the average ratio of major and minor axes thereof is more than 3:1. On the other hand, the major axis may represent the maximum dimension of the crystal grain, and the minimum value (i.e., lower limit) of the average ratio of the major and minor axes of the crystal grain may satisfy 1:1. Meanwhile, the average ratio of the major and minor axes of the crystal grain may be 1.5:1 to 2.5:1 in terms of maximizing the above-mentioned effect.

Meanwhile, in this specification, the major axis of the crystal grain may represent the maximum dimension penetrating through the inside of the crystal grain. In addition, the minor axis of the crystal grain may represent its maximum dimension measured in a direction perpendicular to a measurement direction of the major axis. However, there may be two or more maximum dimensions having the same length and penetrating through the inside of the crystal grain as its major axis. In this case, any of the two or more maximum dimensions may be regarded as the major axis and the minor axis may be measured in the same manner as described above.

Figure 11:
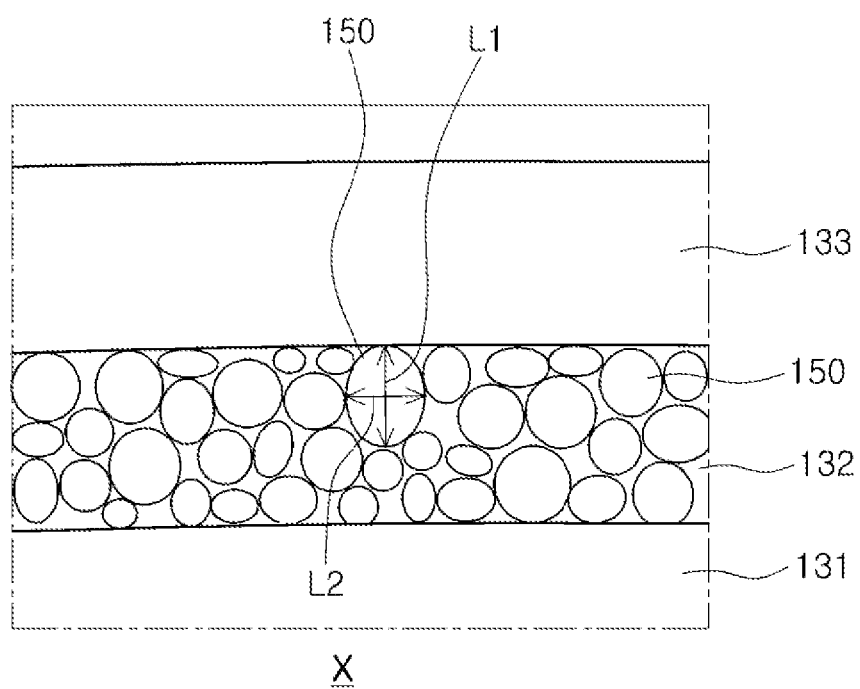
FIG. 11 is an enlarged schematic view of region "X" in FIG. 2.

FIG. 11 is an enlarged schematic view of region "X" in FIG. 2. As shown in FIG. 11, it is possible to obtain the average ratio of major and minor axes (L1:L2) of a crystal grain 150 in the first plating layer 132 by measuring the major axis L1 which is the maximum dimension penetrating through the inside of the crystal grain, and the minor axis L2 which is the maximum dimension measured in the direction perpendicular to the measurement direction of the major axis.

The major and minor axes of the above-mentioned crystal grain may be measured based on the cross section of the multilayer ceramic capacitor that is cut in the thickness (T) direction. For example, as shown in FIG. 2, the average ratio of the major and minor axes of the crystal grain may be obtained by image-scanning and measuring the cross section of the capacitor in the length-thickness (L-T) direction by using the scanning electron microscope (SEM). For example, it is possible to obtain the average ratio of the major and minor axes of the crystal grain by measuring the major and minor axes of each of ten largest crystal grains included in the first plating layer in an order of their sizes when the cross section is captured using the scanning electron microscope (SEM), and then obtaining the average ratio value of the major and minor axes.

According to an exemplary embodiment of the present disclosure, the first plating layers 132 or 142 may include the nickel plating layer, or the first plating layer may be the nickel plating layer. The capacitor may suppress the hydrogen permeation by including the nickel plating layer as the first plating layer.

According to an exemplary embodiment of the present disclosure, a ratio of the crystal grain in which the ratio of major and minor axes thereof satisfies 1:1 to 3:1 may be analyzed to be 50% or more of an entire area of the first plating layer. The present disclosure may secure the above-mentioned effect by including 50% or more of the crystal grains satisfying the above-mentioned ratio of the major and the minor axes because the crystal grains of the present disclosure that satisfies the above-mentioned ratio of the major axis and minor axis may effectively suppress the hydrogen permeation.

According to an exemplary embodiment of the present disclosure, the first plating layer may include the crystal grain having an average size of 0.3 to 1.5 μm. A problem may occur in plating film stress when the first plating layer includes the crystal grain having an average size of less than 0.3 μm. On the other hand, when the first plating layer includes the crystal grain having an average size of more than 1.5 μm, a hydrogen permeation path may be short, which may result in lower product performance, and the capacitor may also have lower hardness, which may adversely affect its mechanical property. An average size of a crystal grain may refer to an average of a major axis and a minor axis of the crystal grain by using the scanning electron microscope (SEM) to measure the major and minor axes of the crystal grain. In one example, an average size may refer to an average of sizes of crystal grains in one predetermined area of a cross-section of the multilayer ceramic capacitor in the length-thickness (L-T) direction, and the size of each crystal grain may refer to an average of a major axis and a minor axis of each crystal grain by using the scanning electron microscope (SEM).

In addition, according to an exemplary embodiment of the present disclosure, the first plating layer may have an average thickness of 1 to 10 μm. The hydrogen permeation may occur due to insufficient Ni coverage when the first plating layer has an average thickness of less than 1 μm. On the other hand, a size of the capacitor may be over in the L, W, or T direction when the first plating layer has an average thickness of more than 10 μm.

The average thickness of the first plating layer may be measured based on the cross section of the multilayer ceramic capacitor that is cut in the thickness (T) direction to observe the first plating layer of the external electrode. For example, as shown in FIG. 2, the average thickness of the first plating layer may be measured by image-scanning the cross-section of the multilayer ceramic capacitor in the length-thickness (L-T) direction by using the scanning electron microscope (SEM) and thus measuring an average value of the respective thicknesses of the first plating layer that is obtained from its thirty points on the same line. Alternatively, the average thickness of the first plating layer may be measured by image-scanning the cross-section of a side of the external electrode in the multilayer ceramic capacitor in the width-thickness (W-T) direction by using the scanning electron microscope (SEM) and thus measuring the average value of respective thicknesses of the first plating layer that is obtained from its thirty points on the same line.

According to an exemplary embodiment of the present disclosure, the first plating layer may include the crystal grain having the major axis of 0.2 to 2 μm. Here, the definition of the major axis of the crystal grain may be the same as that defined above. A problem may occur in the plating film stress when the first plating layer includes the crystal grain having a major axis of less than 0.2 μm. On the other hand, when the first plating layer includes the crystal grain having a major axis of more than 2 μm, the hydrogen permeation path may be short, which may result in the lower product performance, and the capacitor may also have the lower hardness, which may adversely affect its mechanical property.

Meanwhile, according to an exemplary embodiment of the present disclosure, the external electrode may further include a second plating layer disposed on the first plating layer, and the second plating layer may include the tin (Sn) plating layer (or the second plating layer may be the tin (Sn) plating layer).

According to an exemplary embodiment of the present disclosure, the second plating layer may have an average thickness of 2 to 10 μm. A soldering problem may occur due to a Ni—Sn intermetallic compound (IMC) layer when the second plating layer has an average thickness of less than 2 μm. On the other hand, the size of the capacitor may be over in the L, W, or T direction when the second plating layer has an average thickness of more than 10 μm.

According to an exemplary embodiment of the present disclosure, an average ratio W2/W1 of a thickness W2 of the second plating layer to a thickness W1 of the first plating layer may be 1 to 10. A soldering problem may occur due to the intermetallic compound (IMC) layer when the average ratio W2/W1 is less than 1. On the other hand, the size of the capacitor may be over in the L, W, or T direction when the average ratio W2/W1 is more than 10.

In addition, according to an exemplary embodiment of the present disclosure, the external electrode 130 or 140 may further include the electrode layer 131 or 141 disposed between the body 110 and the first plating layers 132 or 142, and connected to the internal electrode 121 or 122. Meanwhile, the description of the electrode layer 131 or 141 may be the same as that described above.

The multilayer electronic component 100 may not need to be limited to a particular size. However, in order for the multilayer electronic component to have the smaller size and simultaneously have the higher capacitance, it is necessary to increase the number of stacks by allowing the dielectric layer and the internal electrode to each have a smaller thickness. The multilayer electronic component 100 having a size of 1005 (i.e., length×width of 1.0 mm×0.5 mm) or less may thus have more remarkably improved reliability according to the present disclosure.

Therefore, in consideration of a manufacturing error, a size of the external electrode and the like, the multilayer electronic component 100 having the length of 1.0 mm or less and the width of 0.5 mm or less may have the more remarkably improved reliability according to the present disclosure. Here, the length of the multilayer electronic component 100 may indicate the maximum size of the multilayer electronic component 100 in the second direction, and the width of the multilayer electronic component 100 may indicate the maximum size of the multilayer electronic component 100 in the third direction.

Next, the description describes a method of manufacturing a multilayer ceramic capacitor according to another aspect of the present disclosure in detail. However, this description does not indicate that the multilayer ceramic capacitor of the present disclosure is required to be manufactured by the following manufacturing method.

Method of Manufacturing Multilayer Ceramic Capacitor

The method of manufacturing a multilayer ceramic capacitor 100 according to another exemplary embodiment of the present disclosure may include: preparing a body 110 including a plurality of internal electrodes 121 and 122 and a dielectric layer 111 interposed between the plurality of internal electrodes; and forming external electrodes 130 and 140 to respectively be connected to the internal electrodes.

Descriptions of the operations of preparing the body and forming the external electrodes in the manufacturing method of the multilayer ceramic capacitor may be the same as the above description for the multilayer ceramic capacitor.

In the present disclosure, the external electrode 130 or 140 may include a first plating layers 132 or 142, and the first plating layer is formed by first plating using periodic pulse inversion plating.

Figure 5:
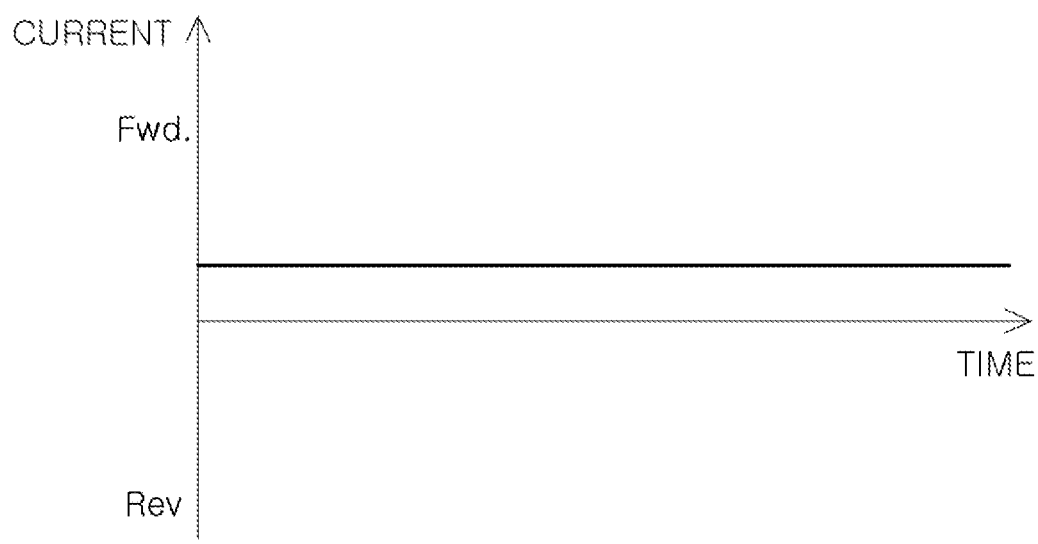
FIG. 5 schematically illustrates a current application profile by a conventional direct current (DC) plating method.

As shown in FIG. 5, in the prior art, a constant current is applied for predetermined time by using a direct current (DC) application profile when nickel (Ni) plating and tin (Sn) plating are performed on a surface of the multilayer ceramic capacitor during sintering in its manufacturing process. Accordingly, hydrogen occurring due to a plating reaction continuously permeates from the outside to the inside of the capacitor during plating time, and an accumulated amount of permeating hydrogen ultimately causes insulation resistance (IR) drop.

Accordingly, as a result of intensive studies to solve this problem of the prior art, the present inventors find that it is possible to form the first plating layer including a round-shaped crystal grain by applying periodic pulse reverse (PPR) plating when forming the first plating layer of the external electrode, thereby ensuring high-temperature reliability of the capacitor by suppressing the hydrogen permeation.

Figure 6:
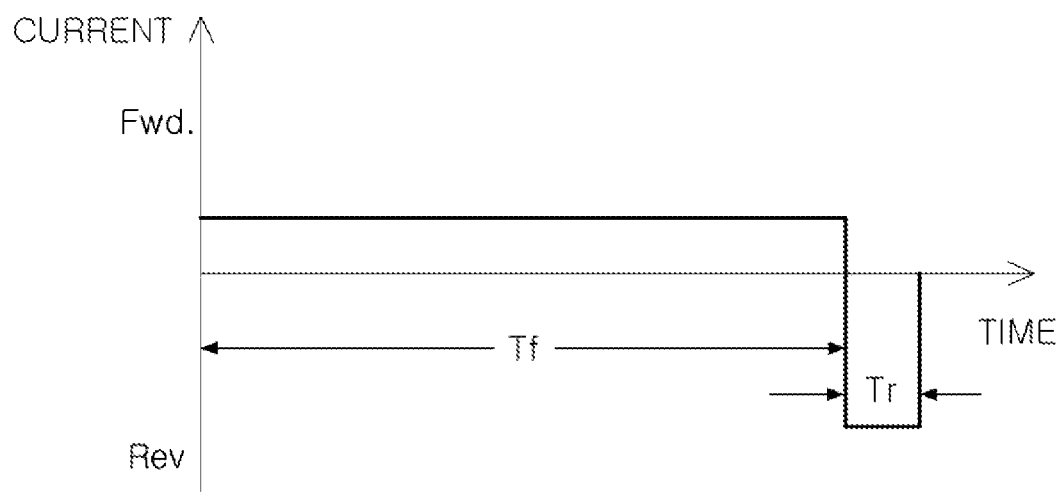
FIG. 6 schematically illustrates a current application profile by a periodic pulse reverse (PPR) plating method according to an exemplary embodiment of the present disclosure.

In detail, unlike the DC application profile of the prior art as shown in FIG. 5, the present disclosure uses a waveform current application profile by periodic pulse inversion (PPR) as shown in FIG. 6. Therefore, although hydrogen may be adsorbed during forward current application time when the plating is performed, the adsorbed hydrogen is desorbed during reverse current application time, and the hydrogen permeation does not easily occur during a plating process. Therefore, the present disclosure may have hydrogen accumulation further reduced by using the PPR plating method compared to the DC plating method of the prior art. The round-shaped crystal grain may be formed also in the first plating layer formed by the PPR plating method.

Figure 7:
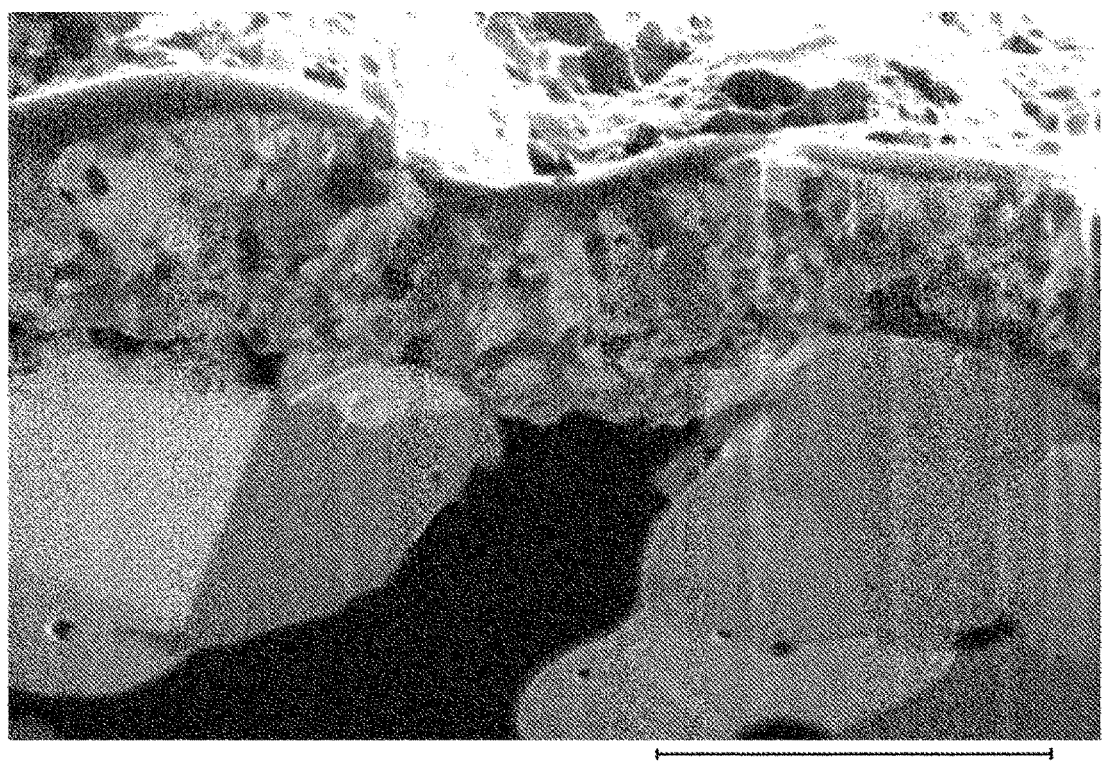
FIG. 7 illustrates a photograph capturing a cross-section of the multilayer ceramic capacitor obtained from Inventive Example 1 of the present disclosure that is cut in a thickness (T) direction by using a scanning electron microscope (SEM)
Figure 8:
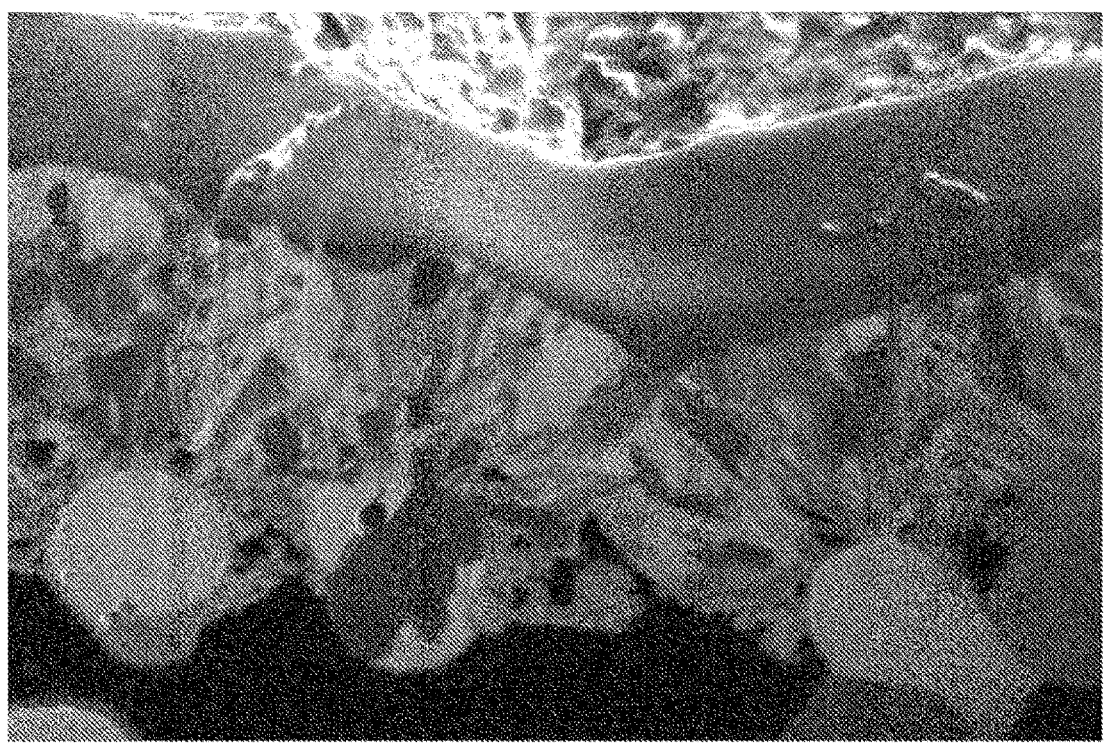
FIG. 8 illustrates a photograph capturing a cross-section of a multilayer ceramic capacitor obtained from Comparative Example 1 of the present disclosure that is cut in a thickness (T) direction by using the scanning electron microscope (SEM)

Therefore, the round crystal grain is formed in the nickel plating layer formed by using the PPR plating method according to the present disclosure as shown in FIG. 7. On the other hand, a sharp crystal grain having a needle-shape is formed in the nickel plating layer formed by using the DC plating method according to the prior art as shown in FIG. 8.

According to an exemplary embodiment of the present disclosure, the first plating layer may include the nickel plating layer, or first plating may be nickel plating.

Meanwhile, the following description describes a condition of the periodic pulse inversion plating performed in another exemplary embodiment of the present disclosure. In detail, as shown in FIG. 6, the periodic pulse inversion plating may include a forward current and a reverse current, and include one or more reverse currents in a waveform. As such, the periodic pulse inversion plating may include one or more reverse currents while including both the forward current and the reversal current, and thus necessarily include a hydrogen desorption process compared to the conventional DC method, thereby further suppressing the hydrogen accumulation during the plating process.

In addition, according to another exemplary embodiment of the present disclosure, in the first plating, the forward current may have density of 0.5 to 20 ASD (amps/dm$^2$ (amps per decimeter squared)), and the reverse current may have density of 0.1 to 20 ASD.

In addition, according to another exemplary embodiment of the present disclosure, a ratio Tf/Tr of forward current time Tf to reverse current time Tr may satisfy a range of 2 to 50. Loss of the external electrode may occur when the ratio Tf/Tr is less than 2. On the other hand, a problem may occur in suppressing the hydrogen permeation when the ratio Tf/Tr is more than 50.

In addition, according to another exemplary embodiment of the present disclosure, the reverse current may have intensity greater than the intensity of the forward current.

The first plating layer may be formed to satisfy the above conditions, and it is thus possible to control the shape of the crystal grain, a distribution form of the crystal grains, or the like, in the first plating layer, and secure high-temperature reliability of the capacitor by suppressing the hydrogen permeation.

According to another exemplary embodiment of the present disclosure, the periodic pulse inversion plating may be continuously performed until the plating is completed, as shown in FIG. 6, and may be performed without separate off-time for setting the current to "zero" until the plating is completed.

In addition, according to another exemplary embodiment of the present disclosure, the first plating may be barrel plating, and in the first plating, a rotation speed of the barrel may satisfy a range of 5 to 30 rpm. The capacitors may adhere to each other or a problem may occur in a thickness distribution of the capacitor when the rotation speed of the barrel is less than 5 rpm or the rotation speed of the barrel is more than 30 rpm during the first plating.

Here, a description of the barrel plating other than the above description may be the same as that of a general content in the art.

According to another exemplary embodiment of the present disclosure, the method may further include forming a second plating layer on the first plating layer after forming the first plating layer by the first plating. Here, a method of forming the second plating layer is not particularly limited, and a description of the method may be the same as the above-description of the second plating layer.

Next, according to another exemplary embodiment of the present disclosure, the method may further include an operation of heat-treating the capacitor at 120 to 200° C. after the above-described plating operation. It is possible to anneal the plating layer, remove moisture from the layer or recover capacitance by performing an additional post-treatment in the above-mentioned high temperature range after performing the plating.

Hereinafter, the present disclosure is described in more detail based on an experimental example. However, it needs to be noted that the following experimental example is provided only to explain the present disclosure by way of example, and not to limit the scope of the present disclosure. The reason is that the scope of the present disclosure is determined by a matter described in the claims and a matter reasonably inferred therefrom.

Experimental Example

For each of Comparative Example 1 and Inventive Example 1, a ceramic paste is formed under the same condition, a ceramic green sheet is formed on a polyethylene terephthalate (PET) film by using the ceramic paste, a Ni internal electrode paste is printed on the ceramic green sheet, and the Ni internal electrode pastes are alternately stacked on each other to form a stack as shown in FIG. 4. The stack formed in this way is sintered, and a copper (Cu) paste is then applied and baked on each of two end surfaces of the stack to thus form an electrode layer electrically connected to internal electrodes.

Next, although nickel (Ni)plating is performed on the electrode layer, a first plating layer is formed by direct current (DC) plating in Comparative Example 1, and using PPR plating in Inventive Example 1. After the plating, a post-heat treatment of a capacitor at a high temperature is performed at 160° C. for 2 hours.

Insulation resistance (IR) reliability drop is accelerated to evaluate the high-temperature IR reliability of the capacitor. In detail, a board on which the capacitor including fired electrodes is mounted is immersed in a 0.01M of sodium hydroxide (NaOH) solution, a DC condition of Comparative Example 1 is then set to satisfy 0.03 A, and only a hydrogen reaction is induced for PPR conditions of Inventive Example 1 to satisfy a forward current (Fwd.) of 0.03 A and 450 ms, and a reverse current (Rev.) of 0.09 A and 50 ms.

Regarding this severe evaluation of the high-temperature IR reliability, in Comparative Example 1, IR drop is confirmed in most of the capacitors of 40 samples when a waveform of the DC plating is applied to the board on which the capacitor including the fired electrodes is mounted.

On the other hand, in Inventive Example 1, it is confirmed that an IR normal value is obtained in every sample when a waveform of the PPR plating is applied to the board on which the capacitor including the fired electrodes is mounted.

Figure 9:
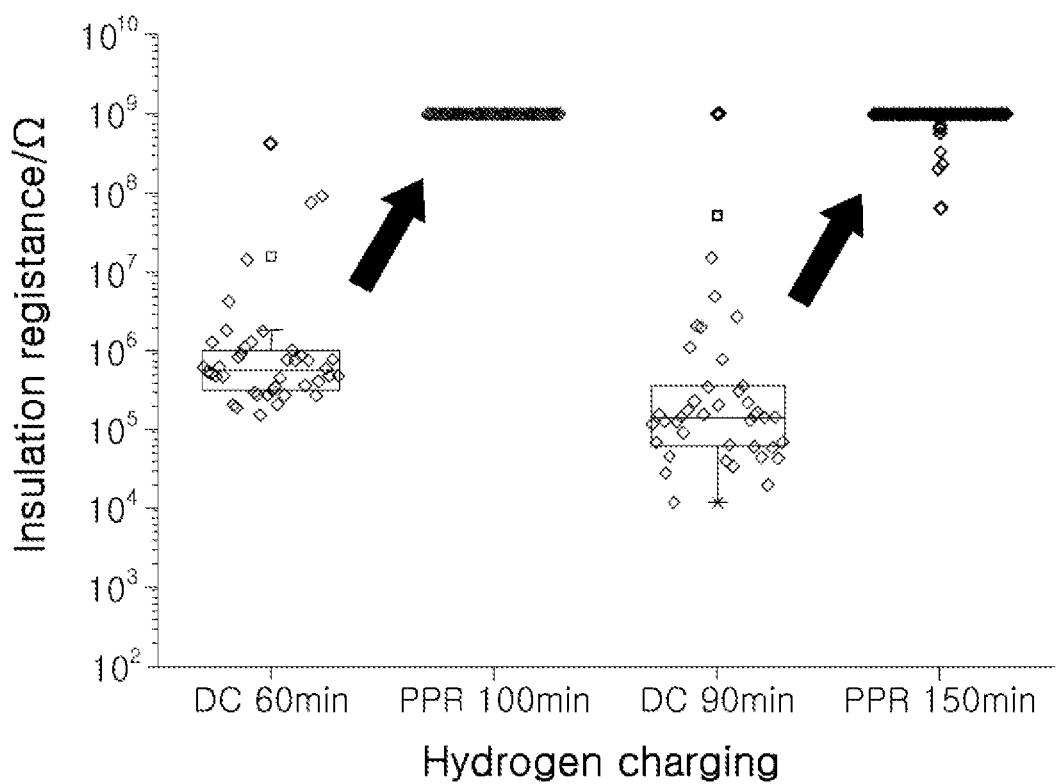
FIG. 9 illustrates evaluation results of high-temperature insulation resistance (IR) reliability for Inventive Example 1 and Comparative Example 1 of the present disclosure.

In addition, the above-described plating time is further extended to perform reproducibility evaluations, and FIG. 9 illustrates these experimental results. The same results as the first evaluation results are obtained for Comparative Example 1 and Inventive Example 1.

In addition, prepared is a cross-sectional specimen of the multilayer ceramic capacitor obtained from each of Comparative Example 1 and Inventive Example 1 described above that is cut in the length-thickness (L-T) direction in order to confirm a shape of a crystal grain in the first plating layer. Next, a surface of the specimen is etched using focused ion beam (FIB) equipment, and the major and minor axes of the Ni crystal grain are then measured by applying 30 KV, 50,000 times magnification, and a SE MODE by using a scanning electron microscope (SEM). Here, the largest crystal grains in an order of their sizes are selected, and the major and minor axes of each of the ten crystal grains are then measured. Table 1 below illustrates an obtained average value of a ratio of the major and minor axes.

Meanwhile, prepared are 40 specimens of the board on which the above-described capacitor including the fired electrodes is mounted, which corresponds to Comparative Example 1 and Inventive Example 1, and the high-temperature IR reliability of each specimen and its uniformity in relation to a change in a thickness distribution are evaluated by a method described below and shown in Table 1 below.

TABLE 1

| No. | Plating method | Average ratio of major and minor axes of crystal grain in first plating layer (major axis:minor axis) | Severe evaluation of High-temperature IR reliability | Evaluation of uniformity in relation to change in thickness distribution |
|---|---|---|---|---|
| Comparative Example 1 | DC plating | 5:1 | x | Appropriate |
| Inventive Example 1 | PPR plating | 2:1 | ○ | Appropriate |

As may be seen from the experimental results in Table 1 above, for Inventive Example 1, in which the first plating layer is formed by applying the periodic pulse inversion (PPR) plating prescribed in the present disclosure, it is confirmed that the first plating layer has the average ratio of the major and minor axes of the crystal grain satisfying a range of 1:1 to 3:1, and the high-temperature IR reliability of the capacitor is excellent. It is also confirmed that the change in the thickness distribution is also insignificant, and the capacitor thus also has excellent uniformity.

In particular, FIG. 7 illustrates a photograph capturing a cross-sectional specimen cut in a length-thickness (L-T) direction thereof by using a scanning electron microscope (SEM) to observe the first plating layer of the multilayer ceramic capacitor obtained from Inventive Example 1. Therefore, it may be confirmed that the first plating layer includes a crystal grain having a round shape compared to the crystal grain of FIG. 8 in which the DC plating described below is used.

On the other hand, for Comparative Example 1, in which the first plating layer is formed by using the DC plating, it is confirmed that the average ratio of the major and minor axes of the crystal grain in the first plating layer is 5:1.

FIG. 8 illustrates a photograph capturing a cross-sectional specimen cut in a length-thickness (L-T) direction thereof by using the scanning electron microscope (SEM) to observe the first plating layer of the multilayer ceramic capacitor obtained from Comparative Example 1. Therefore, it may be confirmed that the first plating layer includes a sharp crystal grain having a needle shape compared to the crystal grain of FIG. 7 in which the PPR plating described above is used.

Figure 10:
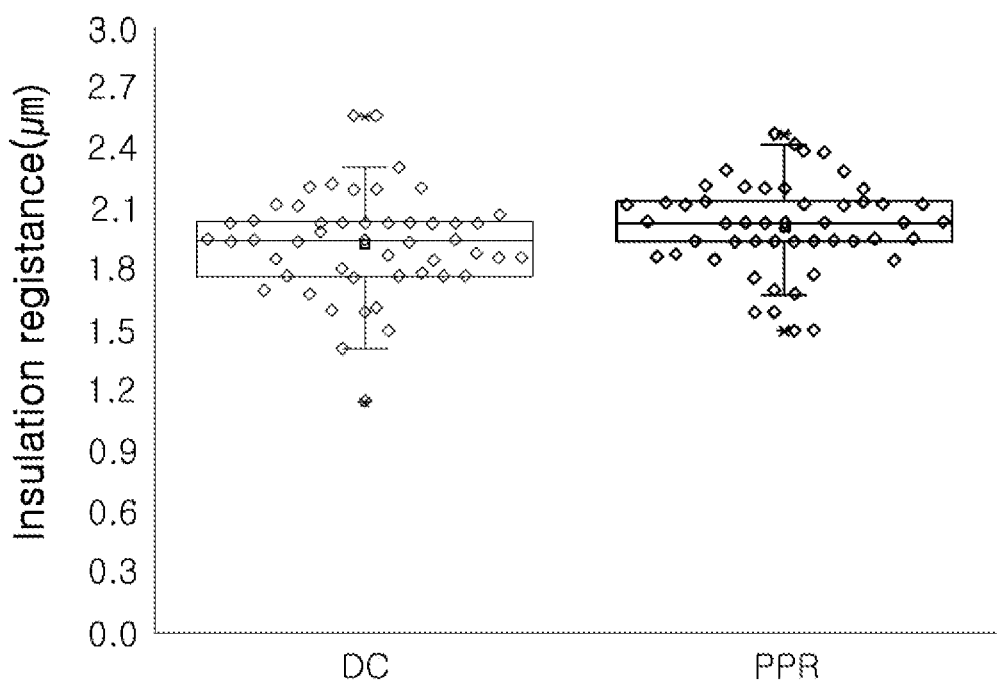
FIG. 10 illustrates uniformity evaluation results for Inventive Example 1 and Comparative Example 1 of the present disclosure.

In addition, thickness results of the Ni plating layer formed by the DC plating to which the barrel plating is applied and that formed by the PPR plating are measured in order to evaluate their uniformities in relation to the change in the thickness distribution, and are shown in FIG. 10.

The capacitor inside a barrel cylinder rotated at a constant speed may not receive a current in the same position when the forward and reverse waveforms are applied thereto in the PPR plating, and a problem may thus occur in thickness distribution thereof as compared to the DC plating. However, as shown in FIG. 10, as a result of cross-sectional analysis of 50 ea (five-fold inspection) for each condition of Inventive Example 1 and Comparative Example 1, even in Inventive Example 1, it is confirmed that there is no significant difference in the thickness distribution, and it is thus confirmed that the uniformity is also appropriate from the uniformity evaluation result.

As set forth above, the present disclosure may provide the multilayer ceramic capacitor having the improved high-temperature reliability by suppressing the hydrogen permeation, and the method of manufacturing the same.

While the exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a body including a plurality of internal electrodes and a dielectric layer interposed between the plurality of internal electrodes; and
   external electrodes disposed on the body and connected to the internal electrodes, respectively,
   wherein one of the external electrodes includes a first plating layer, and the first plating layer includes a crystal grain in which an average ratio of major and minor axes thereof is 1:1 to 3:1.

2. The multilayer ceramic capacitor of claim 1, wherein the first plating layer includes a nickel plating layer.

3. The multilayer ceramic capacitor of claim 1, wherein the major axis represents a maximum dimension of the crystal grain, and
   the minor axis represents a maximum dimension of the crystal grain, measured in a direction perpendicular to a measurement direction of the major axis.

4. The multilayer ceramic capacitor of claim 1, wherein a ratio of the crystal grain in which the ratio of major and minor axes thereof satisfies 1:1 to 3:1 is analyzed to be 50% or more of an entire area of the first plating layer in a cross-section of the multilayer ceramic capacitor.

5. The multilayer ceramic capacitor of claim 1, wherein the average ratio of the major and minor axes of the crystal grain is 1.5:1 to 2.5:1.

6. The multilayer ceramic capacitor of claim 1, wherein the first plating layer includes the crystal grain having an average size of 0.3 to 1.5 μm.

7. The multilayer ceramic capacitor of claim 1, wherein the first plating layer has an average thickness of 1 to 10 μm.

8. The multilayer ceramic capacitor of claim 1, wherein the first plating layer includes the crystal grain having the major axis of 0.2 to 2 μm.

9. The multilayer ceramic capacitor of claim 1, wherein the one of the external electrodes further includes a second plating layer disposed on the first plating layer.

10. The multilayer ceramic capacitor of claim 9, wherein the second plating layer includes a tin (Sn) plating layer.

11. The multilayer ceramic capacitor of claim 9, wherein the second plating layer has an average thickness of 2 to 10 μm.

12. The multilayer ceramic capacitor of claim 9, wherein an average ratio W2/W1 of a thickness W2 of the second plating layer to a thickness W1 of the first plating layer is 1 to 10.

13. The multilayer ceramic capacitor of claim 1, wherein the one of the external electrodes further includes an electrode layer disposed between the body and the first plating layer, and connected to the internal electrode.

14. A multilayer ceramic capacitor comprising:
    a body including a plurality of internal electrodes and a dielectric layer interposed between the plurality of internal electrodes; and
    external electrodes disposed on the body and connected to the internal electrodes, respectively,
    wherein one of the external electrodes includes a first plating layer, and the first plating layer includes a crystal grain having an average size of 0.3 to 1.5 μm, and
    wherein the first plating layer includes a crystal grain having a major axis of 0.2 to 2 μm.

15. The multilayer ceramic capacitor of claim 14, wherein the first plating layer includes a nickel plating layer.

16. The multilayer ceramic capacitor of claim 14, wherein the first plating layer has an average thickness of 1 to 10 μm.

17. The multilayer ceramic capacitor of claim 14, wherein the one of the external electrodes further includes a second plating layer disposed on the first plating layer.

18. The multilayer ceramic capacitor of claim 17, wherein the second plating layer includes a tin (Sn) plating layer.

19. The multilayer ceramic capacitor of claim 17, wherein the second plating layer has an average thickness of 2 to 10 μm.

* * * * *